US010831662B1

(12) United States Patent
Patidar et al.

(10) Patent No.: US 10,831,662 B1
(45) Date of Patent: Nov. 10, 2020

(54) SYSTEMS AND METHODS FOR MAINTAINING CACHE COHERENCY

(71) Applicant: Veritas Technologies LLC, Santa Clara, CA (US)

(72) Inventors: Jitendra Patidar, Pune (IN); Anindya Banerjee, Pune (IN); Kundan Kumar, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 0 days.

(21) Appl. No.: 16/544,590

(22) Filed: Aug. 19, 2019

Related U.S. Application Data

(63) Continuation of application No. 15/727,244, filed on Oct. 6, 2017, now Pat. No. 10,452,545.

(51) Int. Cl.
| | |
|---|---|
| *G06F 12/08* | (2016.01) |
| *G06F 12/0815* | (2016.01) |
| *G06F 12/0866* | (2016.01) |
| *G06F 12/0875* | (2016.01) |
| *G06F 12/084* | (2016.01) |

(52) U.S. Cl.
CPC ...... *G06F 12/0815* (2013.01); *G06F 12/0866* (2013.01); *G06F 12/084* (2013.01); *G06F 12/0875* (2013.01)

(58) Field of Classification Search
CPC ............. G06F 12/0815; G06F 12/0866; G06F 12/0875
See application file for complete search history.

(56) References Cited

U.S. PATENT DOCUMENTS

| | | | |
|---|---|---|---|
| 6,343,346 | B1 | 1/2002 | Olnowich |
| 6,591,307 | B1 | 7/2003 | Arimilli et al. |
| 7,698,505 | B2 | 4/2010 | Temple, III |
| 8,046,539 | B2 | 10/2011 | George et al. |
| 8,275,815 | B2 | 9/2012 | Aronovich et al. |
| 8,495,110 | B2 | 7/2013 | Aronovich et al. |
| 9,298,624 | B2 | 3/2016 | Ren et al. |
| 10,452,545 | B1 | 10/2019 | Patidar et al. |

(Continued)

OTHER PUBLICATIONS

Non-Final Office Action received for U.S. Appl. No. 15/727,244 dated Nov. 8, 2018, 29 pages.

(Continued)

*Primary Examiner* — Masud K Khan
(74) *Attorney, Agent, or Firm* — FisherBroyles, LLP

(57) ABSTRACT

The disclosed computer-implemented method for maintaining cache coherency may include (1) receiving an indication of a revocation of a grant to an owner node of a shared lock for a data object owned by the owner node, (2) invalidating, in response to the indication, a copy of the object in a local cache of the owner node, (3) releasing, in response to the indication, the grant of the shared lock, (4) receiving, after the releasing of the grant, a request from the requesting node to update the object in the cache, (5) transmitting, in response to the request to update the object, a request for a shared lock for the object, (6) receiving an indication of a grant of the shared lock, and (7) updating, in response to the grant of the shared lock, the object in the cache. Various other methods, systems, and computer-readable media are also disclosed.

20 Claims, 7 Drawing Sheets

(56) References Cited

U.S. PATENT DOCUMENTS

| | | | |
|---|---|---|---|
| 2005/0066095 A1* | 3/2005 | Mullick | G06F 16/1774 710/200 |
| 2014/0012936 A1 | 1/2014 | Aikoh et al. | |
| 2015/0261439 A1 | 9/2015 | Kumar et al. | |
| 2016/0350352 A1 | 12/2016 | Hase et al. | |
| 2018/0293693 A1 | 10/2018 | Ray et al. | |

OTHER PUBLICATIONS

Notice of Allowance received for U.S. Appl. No. 15/727,244 dated May 20, 2019, 18 pages.
Oracle, "Oracle Coherence 12CR2", Oracle Data Sheet, 2015, pp. 1-5.
Veritas, "Veritas SmartIO", 2015, pp. 1-9.

* cited by examiner

SYSTEMS AND METHODS FOR MAINTAINING CACHE COHERENCY

CROSS REFERENCE TO RELATED APPLICATION

This application is a continuation of U.S. application Ser. No. 15/727,244, filed Oct. 6, 2017, the disclosure of which is incorporated, in its entirety, by this reference.

BACKGROUND

In many clustered data storage systems, each of multiple storage servers (e.g., "nodes") operate cooperatively to provide concurrent access for multiple clients to a data store. Typically, each node is responsible for, or "owns," a separate set of stored data objects of the data store. While each of the nodes may facilitate access to any stored data object, a node that does not own a data object typically requests that data object from the owner node of the data object, presuming the requesting node has not cached a current copy of the data object locally. If the owner node stores a current copy of the data object in its local cache (e.g., a relatively fast memory device or solid-state drive (SSD)), the owner node may service the request directly from that cache. Otherwise, the owner node may retrieve the data object from a relatively slower backend data storage system (e.g., a magnetic disk drive system), forward the data object to the requesting node, and store the data object in its local cache to service additional requests.

If a requesting node performs a write operation of a data object for which it is not the owner, the requesting node typically invalidates any copy of the object in the local cache of the corresponding owner node, as well as other nodes, before causing the object to be written to the backend storage system. Consequently, the first subsequent read operation from any other node for that object, including a read operation from the owner node, typically causes the owner node to retrieve the data object from the slower backend data storage.

SUMMARY

As will be described in greater detail below, the instant disclosure describes various systems and methods for maintaining cache coherency by updating a data object stored in a local cache of an owner node for the data object, such that the nodes of the storage system may facilitate faster read access to the data object by not requiring the owner node to perform a read operation of a backend storage system storing the data object to serve subsequent read requests for the data object.

In one embodiment, a method for maintaining cache coherency may include (1) receiving, by an owner node of a plurality of nodes of a clustered storage system, an indication of a revocation of a grant to the owner node of a shared lock for a data object owned by the owner node, (2) invalidating, by the owner node in response to the indication of the revocation of the grant to the owner node of the shared lock, a copy of the data object in a local cache of the owner node, (3) releasing, by the owner node in response to the indication of the revocation of the grant to the owner node of the shared lock, the grant of the shared lock, (4) receiving, by the owner node after the releasing of the grant of the shared lock, a request from a first requesting node to update the data object in the local cache, (5) transmitting, by the owner node in response to the request to update the data object, a request for a shared lock for the data object, (6) receiving, by the owner node, an indication of a grant of the shared lock to the owner node, and (7) updating, by the owner node in response to the grant of the shared lock, the data object in the local cache.

In some examples, the updating of the data object in the local cache may include populating the data object in the local cache with data received in the request to update the data object. In some examples, the method may further include (1) receiving, by the owner node from a second requesting node of the plurality of nodes, a request to read the data object, and (2) transmitting, by the owner node to the second requesting node in response to the request to read the data object, the data object from the local cache of the owner node to the second requesting node.

In some examples, the local cache of the owner node may be located on a solid-state drive of the owner node.

In some examples, (1) the receiving, by the owner node, of the request from the first requesting node to update the data object may occur while the first requesting node holds a grant of an exclusive lock for the data object, (2) the request for the shared lock may include a preferred request for the shared lock prior to a release of the grant of the exclusive lock by the first requesting node, and (3) the grant of the shared lock to the owner node may occur prior to grants of preceding requests for a lock for the data object. In some examples, the release of the grant by the first requesting node of the exclusive lock may be initiated in response to a non-preferred request for the shared lock for the data object from a second requesting node of the plurality of nodes in response to the second requesting node receiving a read request for the data object. In some examples, the release of the grant by the first requesting node of the exclusive lock may be initiated in response to a non-preferred request for the shared lock from the owner node in response to the owner node receiving a read request for the data object. In some examples, the release of the grant by the first requesting node of the exclusive lock may be initiated in response to a non-preferred request for the shared lock from the owner node in response to a predetermined amount of time elapsing from the invalidating of the copy of the data object in the local cache of the owner node. In some examples, the release of the grant by the first requesting node of the exclusive lock may be initiated in response to an amount of data stored in a temporary cache of the first requesting node exceeding a predetermined limit. In some examples, the release of the grant by the first requesting node of the exclusive lock may be initiated in response to an amount of time during which update data for the data object has remained in a temporary cache of the first requesting node exceeding a predetermined limit.

In some examples, the receiving, by the owner node, of the request from the first requesting node to update the data object may occur while the first requesting node holds a grant of a shared lock for the data object. In some examples, the first requesting node may hold the grant of the shared lock as a result of a downgrade of a grant to the first requesting node of an exclusive lock for the data object. In some examples, the downgrade of the exclusive lock to the shared lock may be initiated by the first requesting node. In some examples, the downgrade may occur after the first requesting node stores data for the request to update the data object in a backend storage system accessible by the owner node.

In some examples, the indication of the grant of the shared lock to the owner node may occur while the first requesting node retains the grant of the shared lock to the first requesting node. In some examples, the invalidating of the copy of the data object in the local cache of the owner node may occur concurrently with the invalidating of a copy of the data object in a local cache of at least one other node of the plurality of nodes. In some examples, the receiving of the request to update the data object in the local cache may include storing, by the owner node, data in the request to update the data object to a temporary cache of the owner node that is separate from the local cache of the owner node. In some examples, the receiving, by the owner node, of the indication of a revocation of the grant to the owner node of the shared lock may be responsive to a request by the first requesting node for a grant of an exclusive lock for the data object to initiate an update operation of the data object to a backend storage system accessible by the owner node.

In one example, a system for maintaining cache coherency may include several modules stored in memory, including (1) a local communication module that may receive an indication of a revocation of a grant to an owner node of a plurality of nodes of a clustered storage system of a shared lock for a data object owned by the owner node, (2) a local cache control module that may invalidate, in response to the indication of the revocation of the grant to the owner node of the shared lock, a copy of the data object in a local cache of the owner node, where the lock communication module, in response to the indication of the revocation of the grant to the owner node of the shared lock, may release the grant of the shared lock (3) a node communication module that may receive a request from a requesting node to update the data object in the local cache after the releasing of the grant of the shared lock, and (4) at least one physical processor that may execute that lock communication module, the local cache control module, and the node communication module. The lock communication module may also transmit, in response to the request to update the data object, a request for a shared lock for the data object, and may also receive an indication of a grant of the shared lock to the owner node. The local cache control module may also update, in response to the grant of the shared lock, the data object in the local cache.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive an indication of a revocation of a grant to an owner node of a plurality of nodes of a clustered storage system of a shared lock for a data object owned by the owner node, (2) invalidate, in response to the indication of the revocation of the grant to the owner node of the shared lock, a copy of the data object in a local cache of the owner node, (3) release, in response to the indication of the revocation of the grant to the owner node of the shared lock, the grant of the shared lock, (4) receive, after the releasing of the grant of the shared lock, a request from a requesting node to update the data object in the local cache, (5) transmit, in response to the request to update the data object, a request for a shared lock for the data object, (6) receive an indication of a grant of the shared lock to the owner node, and (7) update, in response to the grant of the shared lock, the data object in the local cache.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
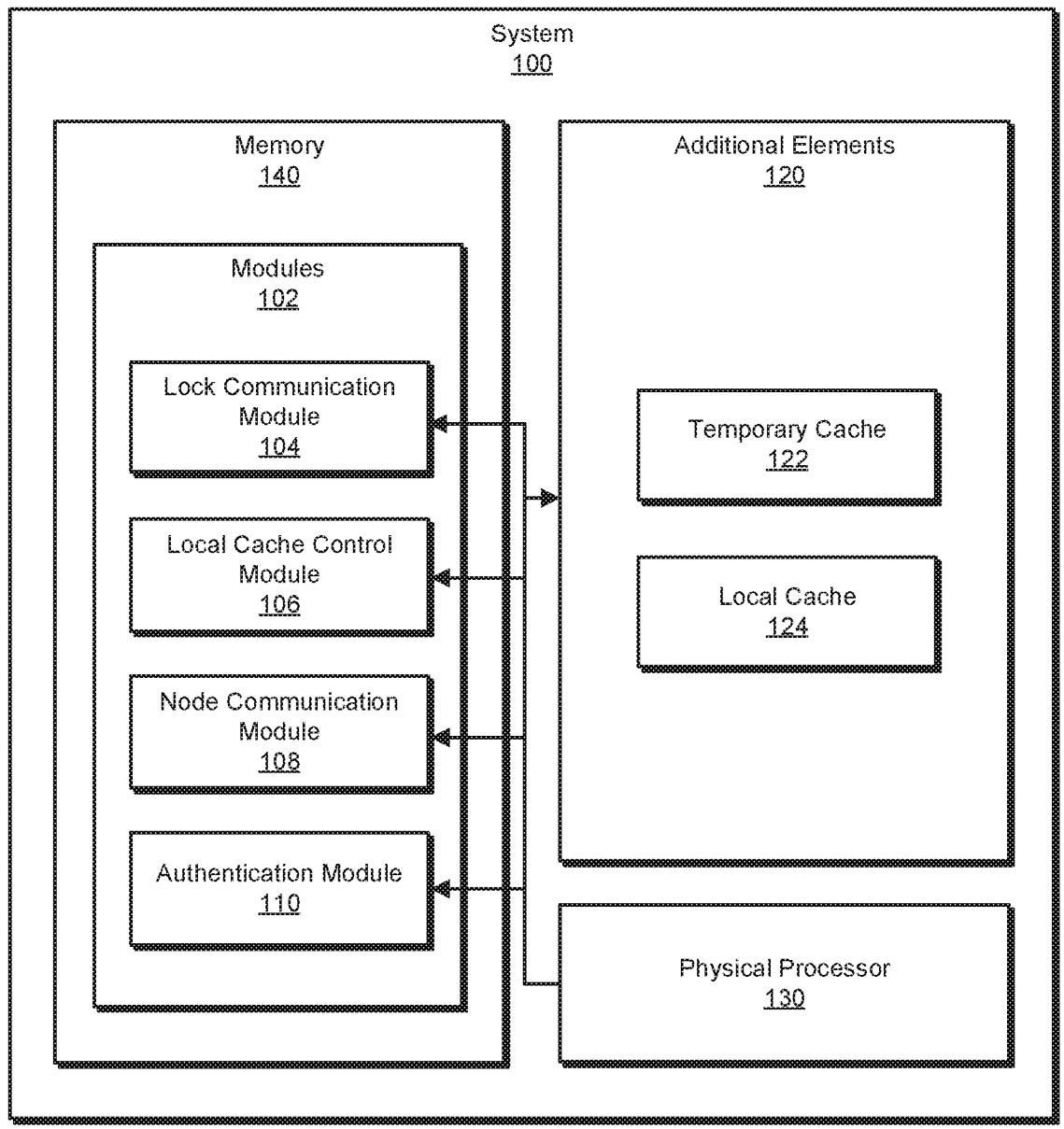
FIG. 1 is a block diagram of an example system for maintaining cache coherency.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for maintaining cache coherency. As will be explained in greater detail below, a node of a clustered storage system may cause a data object to be updated in a local cache of an owner node for the data object. By updating the data object in the local cache of the owner node, the various systems and methods described herein may facilitate faster read access to the data object by not requiring the owner node to perform a read operation of a backend storage system storing the data object in response to a read request that is received after the updating of the data object.

Figure 2:
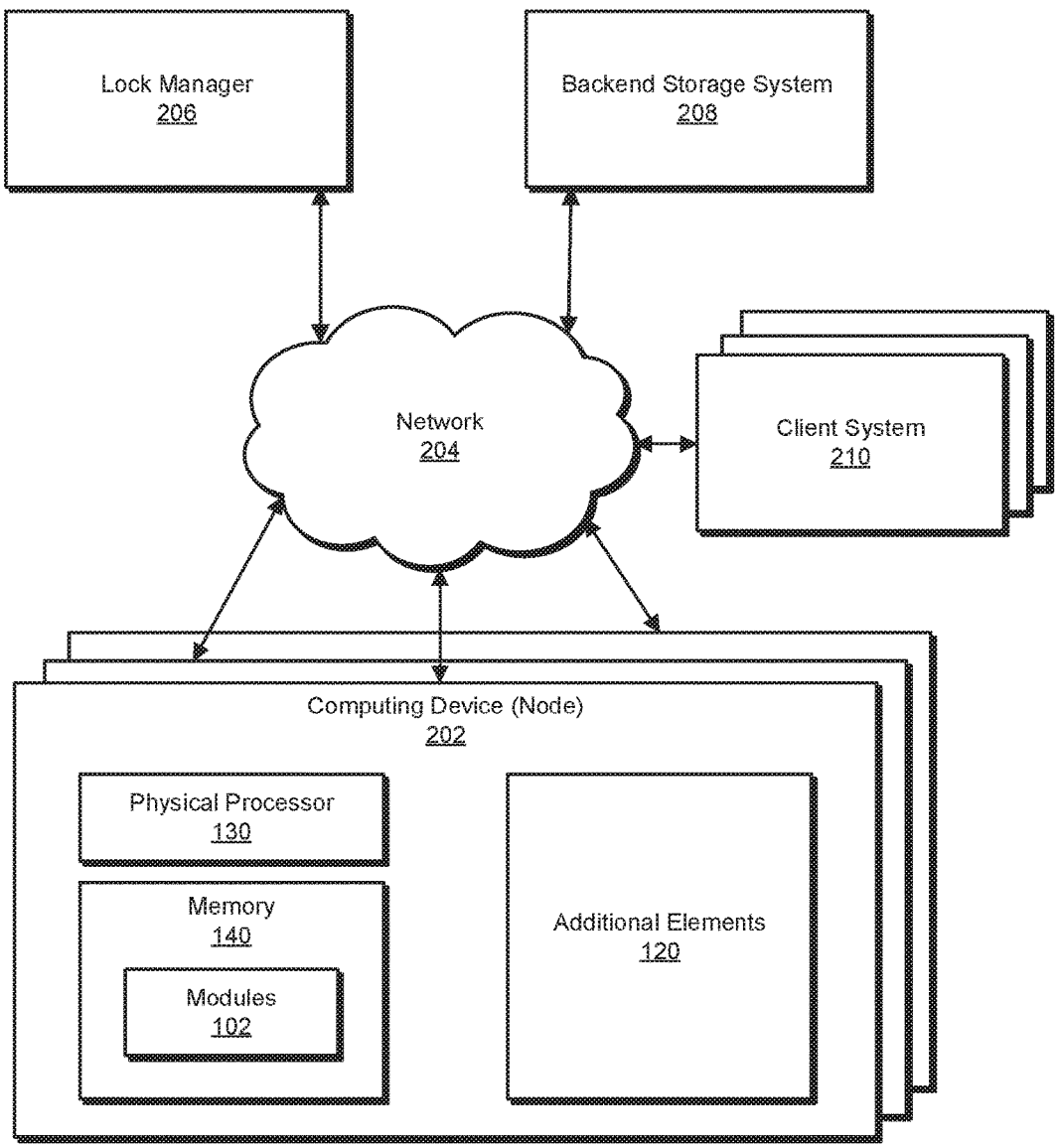
FIG. 2 is a block diagram of an additional example system for maintaining cache coherency.

The following will provide, with reference to FIGS. 1 and 2, detailed descriptions of example systems for maintaining cache coherency. Detailed descriptions of corresponding computer-implemented methods will also be provided in connection with FIGS. 3 and 4. In addition, detailed descriptions of example methods will also be presented in conjunction with FIGS. 5 through 7.

FIG. 1 is a block diagram of an example system 100 for maintaining cache coherency. As illustrated in this figure, example system 100 may include one or more modules 102 for performing one or more tasks. As will be explained in greater detail below, modules 102 may include a lock communication module 104, a local cache control module 106, and a node communication module 108. In some example examples, modules 102 may also include an authentication module 110. Although illustrated as separate elements, one or more of modules 102 in FIG. 1 may represent portions of a single module or application.

In example embodiments described in greater detail below, system 100 is employed as one of several cluster nodes in a clustered storage system in which multiple data objects (e.g., files, portions of files, and so on) are stored, updated, and otherwise accessed. In example embodiments, lock communication module 104 may perform communications between system 100 and one or more other systems to obtain or release logical "locks" governing access to data objects via system 100. In some examples, local cache control module 106 controls a local cache 124 (described below), such as by controlling storing, updating, and accessing of data objects in local cache 124. Node communication module 108 may perform communications between system 100 and other computing systems, such as those computing systems operating as nodes of a clustered storage system, those computing systems operating as a backend storage system, those computing systems operating as client systems, or other types of computing systems. Authentication module 110, in example embodiments, authenticates received data for updating one or more data objects for storage in local cache 124.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices 202, such as the computing devices 202 illustrated in FIG. 2 (e.g., operating as cluster nodes of a clustered storage system). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate maintaining cache coherency. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more additional elements 120, such as a temporary cache 122 and a local cache 124. In some example embodiments, temporary cache 122 may temporarily store data for data objects that are to be stored or updated in local cache 124 of system 100, or in a similar local cache of other systems. In some examples, local cache 124 may store data objects for access by system 100 or other systems. In example embodiments, each of temporary cache 122 and local cache 124 generally represents any type or form of volatile or non-volatile storage device or medium capable of storing data. Examples of temporary cache 122 and local cache 124 include, without limitation, RAM, flash memory, HDDs, SSDs, optical disk drives, variations or combinations of one or more of the same, or any other suitable storage memory. In some examples, temporary cache 122 may be an in-memory cache that may be employed in one or more RAM devices or systems, while local cache 124 may be implemented in an SSD. In some example embodiments, temporary cache 122 and local cache 124 may be implemented in the same or different memory devices. Also in some example embodiments, one or both of temporary cache 122 and local cache 124 may be included in the memory 140.

Example system 100 in FIG. 1 may be implemented in a variety of ways. For example, all or a portion of example system 100 may represent portions of example system 200 in FIG. 2. As shown in FIG. 2, system 200 may include multiple computing devices 202 in communication with one or more of a lock manager 206, a backend storage system 208, and one or more client systems 210 via a network 204. In one example, all or a portion of the functionality of modules 102 may be performed by one or more of computing devices 202, lock manager 206, backend storage system 208, client systems 210, and/or any other suitable computing system. As will be described in greater detail below, one or more of modules 102 from FIG. 1, when executed by at least one processor of computing device 202, may enable computing devices 202 to operate in conjunction with lock manager 206 and/or backend storage system 208 to maintain cache coherency, such as in a distributed cache provided by computing devices 202 for access by client systems 210.

Computing device 202 generally represents any type or form of computing device capable of reading computer-executable instructions. In some examples, each computing device 202 operates as a node of a clustered storage system, in which one or more of computing devices 202 (e.g., using local cache 124) provides a portion of a distributed cache holding copies of one or more data objects stored in backend storage system 208. Client system 210 generally represents any type or form of computing device capable of reading computer-executable instructions. In some examples, each client system 210 operates as a user computing system or other computing system that communicates with one or more computing devices 202 to access data objects stored in backend storage system 208. Additional examples of computing devices 202 and client system 210 include, without limitation, laptops, tablets, desktops, servers, cellular phones, Personal Digital Assistants (PDAs), multimedia players, embedded systems, wearable devices (e.g., smart watches, smart glasses, etc.), smart vehicles, so-called Internet-of-Things devices (e.g., smart appliances, etc.), gaming consoles, variations or combinations of one or more of the same, or any other suitable computing device.

Lock manager 206 generally represents any type or form of computing device that is capable of managing one or more locks governing access to the data objects stored in backend storage system 208 and local caches 124 of computing devices 202. Backend storage system 208 generally represents any type or form of computing device that is capable of storing multiple data objects that may be updated, read, or otherwise accessed by client systems 210 via computing devices 202. Additional examples of lock manager 206 and backend storage system 208 include, without limitation, storage servers, database servers, application servers, and/or web servers configured to run certain software applications and/or provide various storage, database, and/or web services. Although illustrated as single entities in FIG. 2, lock manager 206 and backend storage system 208 may each include and/or represent a plurality of servers that work and/or operate in conjunction with one another.

Network 204 generally represents any medium or architecture capable of facilitating communication or data transfer. In one example, network 204 may facilitate communication between computing devices 202, lock manager 206, backend storage system 208, and client systems 210. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives (SSDs) and flash media), and other distribution systems.

Figure 3:
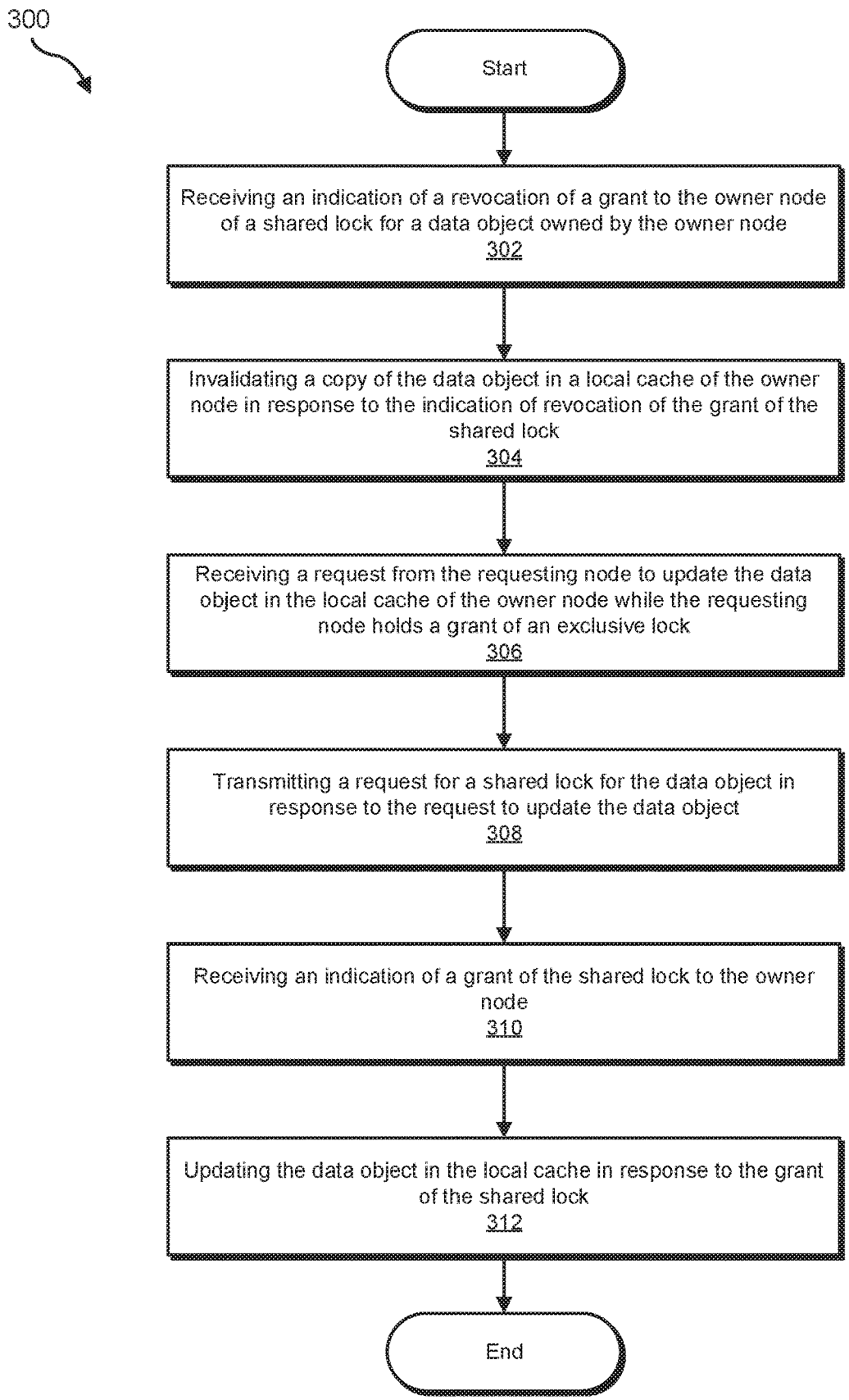
FIG. 3 is a flow diagram of an example method for maintaining cache coherency.

FIG. 3 is a flow diagram of an example computer-implemented method 300 for maintaining cache coherency. The steps shown in FIGS. 3 and 4 may be performed by any suitable computer-executable code and/or computing system, including system 100 in FIG. 1, system 200 in FIG. 2, and/or variations or combinations of one or more of the same. In one example, each of the steps shown in FIGS. 3 and 4 may represent an algorithm whose structure includes and/or is represented by multiple sub-steps, examples of which will be provided in greater detail below.

In an example embodiment, a computing device 202 operating as an "owner" node performs method 300 to facilitate access to a data object owned by the owner node. In example embodiments, an owner node is responsible for providing access to one or more of a distinct subset of data objects stored in backend storage system 208. For example, an owner node for a data object may store a copy of the data object in a local cache 124 of the owner node. Also in some examples, other computing devices 202 operating as nodes other than the owner node for a data object may also store an up-to-date copy of that data object in their respective local caches 124 by accessing a copy of the data object from local cache 124 of the owner node for that data object.

In example embodiments, a lock governing access to a data object may be an exclusive lock or a shared lock. In an example, lock manager 206 may grant an exclusive lock to a single node to facilitate updating (e.g., writing) of the data object, thus prohibiting other nodes from accessing the data object while the single node holds (e.g., does not release) the grant of the exclusive lock. Also in an example, lock manager 206 may grant a shared lock to one or more nodes to facilitate reading of the data object while no node holds a grant of the exclusive lock for the data object, thus prohibiting other nodes from updating the data object while at least one node holds a grant of the shared lock. Also in some examples, a node to which lock manager 206 has granted an exclusive lock may employ that lock to serialize updates to the associated data object by multiple processes executing within the node, such as by facilitating use of the lock by one process of the node at a time. Further, in some examples, a node to which lock manager 206 has granted a shared lock may facilitate shared read access to the associated data object among the processes of the node using the shared lock.

As illustrated in FIG. 3, at step 302, one or more of the systems described herein (e.g., computing device 202 operating as an owner node of a clustered storage system) may receive (e.g., by lock communication module 104 from lock manager 206 via network 204) an indication of a revocation of a grant currently held by the owner node of a shared lock for a data object owned by the owner node. In an example, lock manager 206 may provide such an indication in response to another node (e.g., a "requesting" node) requesting an exclusive lock for the data object from lock manager 206 via network 204. In some examples, the owner node holds a grant of a shared lock for the data object while a copy of the data object is stored in local cache 124 of the owner node.

At step 304, in response to the indication of the revocation of the grant of the shared lock to the owner node (e.g., as received by lock communication module 104), the owner node (e.g., via local cache control module 106) may invalidate any copy of the data object stored in local cache 124 of the owner node. In some examples, any other node that is storing a copy of the data object in its local cache 124 may also invalidate that copy stored in its local cache 124.

At step 306, the owner node may receive a request from the requesting node (e.g., by node communication module 108) to update the data object in local cache 124 of the owner node while the requesting node holds a grant of an exclusive lock for the data object. In some examples, the request may include update data to be stored in local cache 124 of the owner node to update the data object. Also in an example, the owner node, upon receiving the request, may store the update data locally (e.g., in temporary cache 122 of the owner node) in preparation for updating the data object in local cache 124 of the owner node.

At step 308, the owner node (e.g., using lock communication module 104) may transmit a request (e.g., to lock manager 206) for a shared lock for the data object in response to the request to update the data object, as previously received by the owner node. As is described in greater detail below, in some examples the request may be a "preferred" request for the shared lock that lock manager 206 serves prior to preceding requests for a lock governing access to the data object.

At step 310, the owner node (e.g., by lock communication module 104) may receive an indication (e.g., from lock manager 206) of a grant of the shared lock to the owner node in response to the request by the owner node for the shared lock. In some examples, lock manager 206 may also transmit an indication of the shared lock to other nodes.

At step 312, the owner node (e.g., by local cache control module 106) may update the data object in local cache 124 (e.g., using the update data stored in temporary cache 122) in response to the grant of the shared lock. Consequently, in some example embodiments, the owner node may serve read requests for the data object that are received by the owner node, as well as by other nodes of the clustered storage system, using the newly updated copy of the data object in local cache 124.

Figure 4:
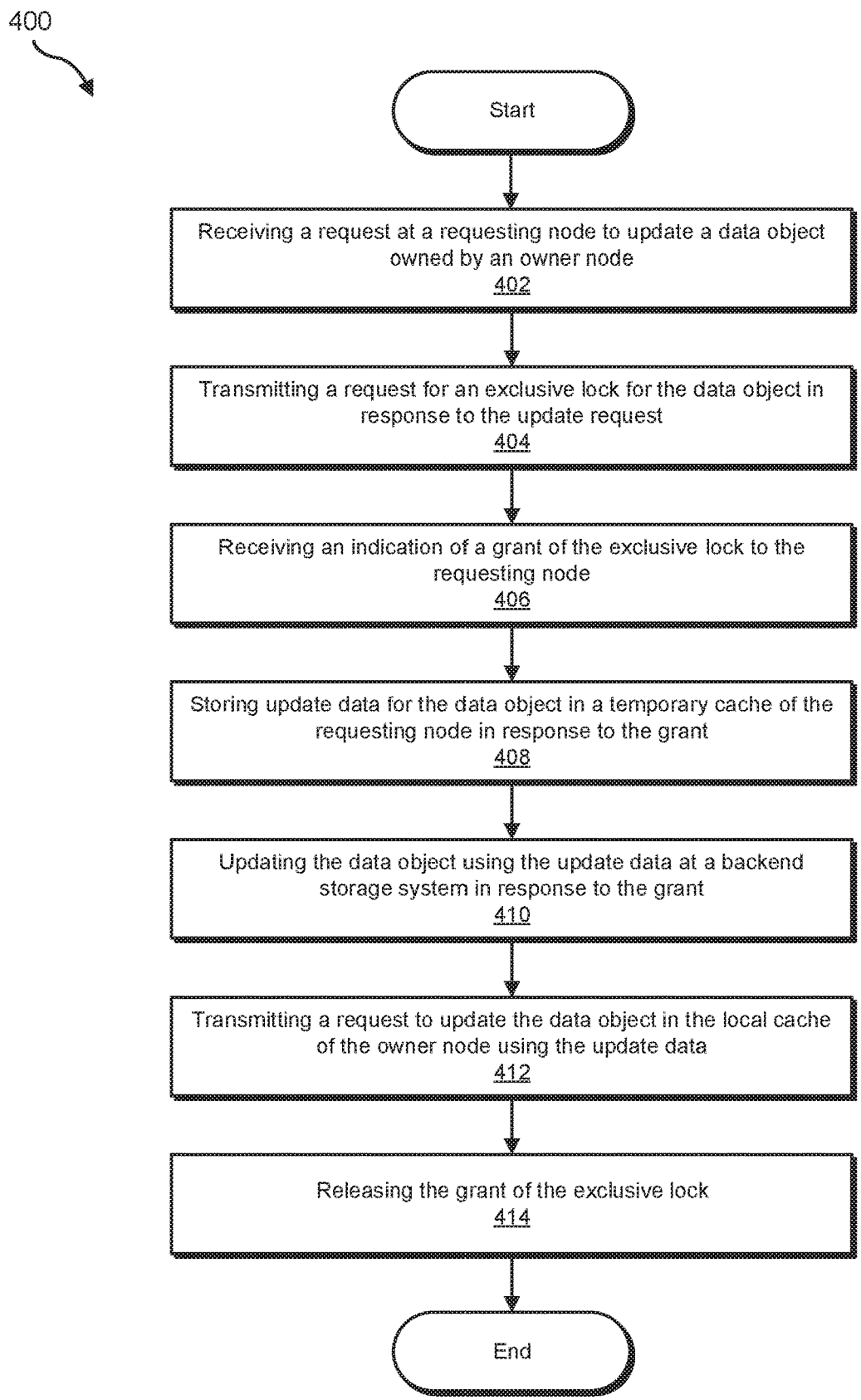
FIG. 4 is a flow diagram of an additional example method for maintaining cache coherency.

FIG. 4 is a flow diagram of an example computer-implemented method 400 for maintaining cache coherency. In an example embodiment, a requesting node, as mentioned above, performs method 400 to facilitate the updating of a copy of a data object in local cache 124 of the owner node for that data object. At step 402, the requesting node may receive a request (e.g., by node communication module 108) to update a data object owned by the owner node. In some examples, the requesting node may receive the request from a client system 210 (e.g., initiated by an application executing on client system 210) via network 204. In some examples, the request to update the data object may include the update data to be stored in the data object.

In step 404, the requesting node, in response to receiving the data update request, may transmit a request (e.g., to lock manager 206 using lock communication module 104) for an exclusive lock for the data object. In step 406, the requesting node may receive an indication (e.g., from lock manager via lock communication module 104) of a grant of the exclusive lock to the requesting node in response to the request for the exclusive lock. In some examples, the granting of the exclusive lock to the requesting node may occur when all other nodes have released any outstanding exclusive or shared lock for the data object.

In step 408, the requesting node, in response to receiving the indication of the grant of the exclusive lock, may store update data of the data request for the data object (e.g., locally in temporary cache 122). In some examples, the requesting node stores the update data locally in preparation for forwarding the update data to the owner node, such as for storing in local cache 124 of the owner node.

In step 410, the requesting node may update the data object at backend storage system 208 (e.g., using node communication module 108 to communicate with backend storage system 208) in response to the grant of the exclusive lock governing access to the data object. In step 412, the requesting node may also transmit a request (e.g., using node communication module 108) to update the data object in local cache 124 of the owner node using the update data. In some example embodiments described in greater detail below, the requesting node may transmit the request to update the data object to the owner node in response to an event that occurs in the requesting node, the owner node, or another node.

In step 414, the requesting node may release the grant of the exclusive lock (e.g., by using lock communication module 104 to communicate with lock manager 206). In some examples, the requesting node may transmit the request to update the data object to the owner node while holding the grant of the exclusive lock, or after releasing the grant of the exclusive lock, as described more fully below.

Figure 5:
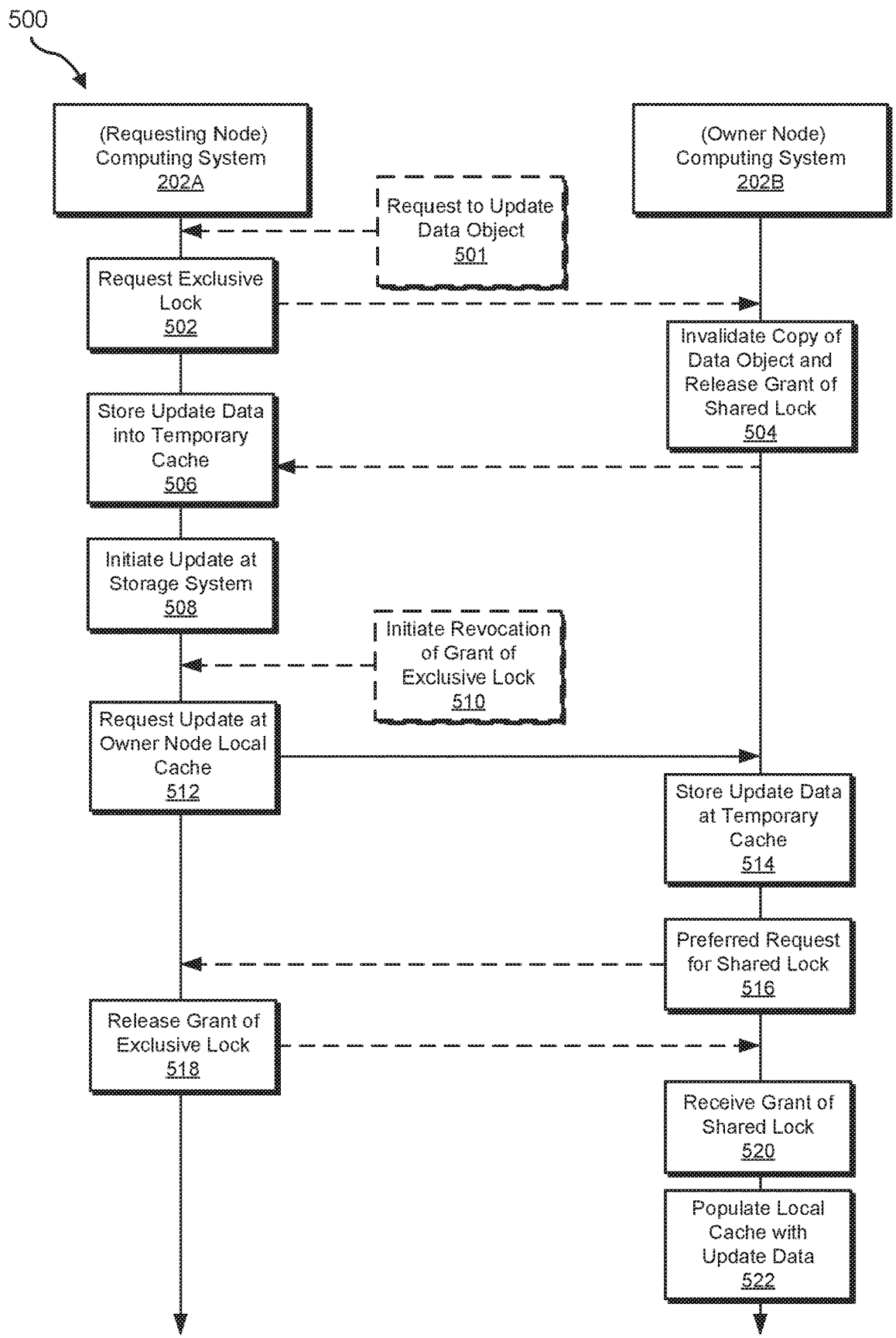
FIG. 5 is a communication diagram illustrating an example method for maintaining cache coherency.
Figure 6:
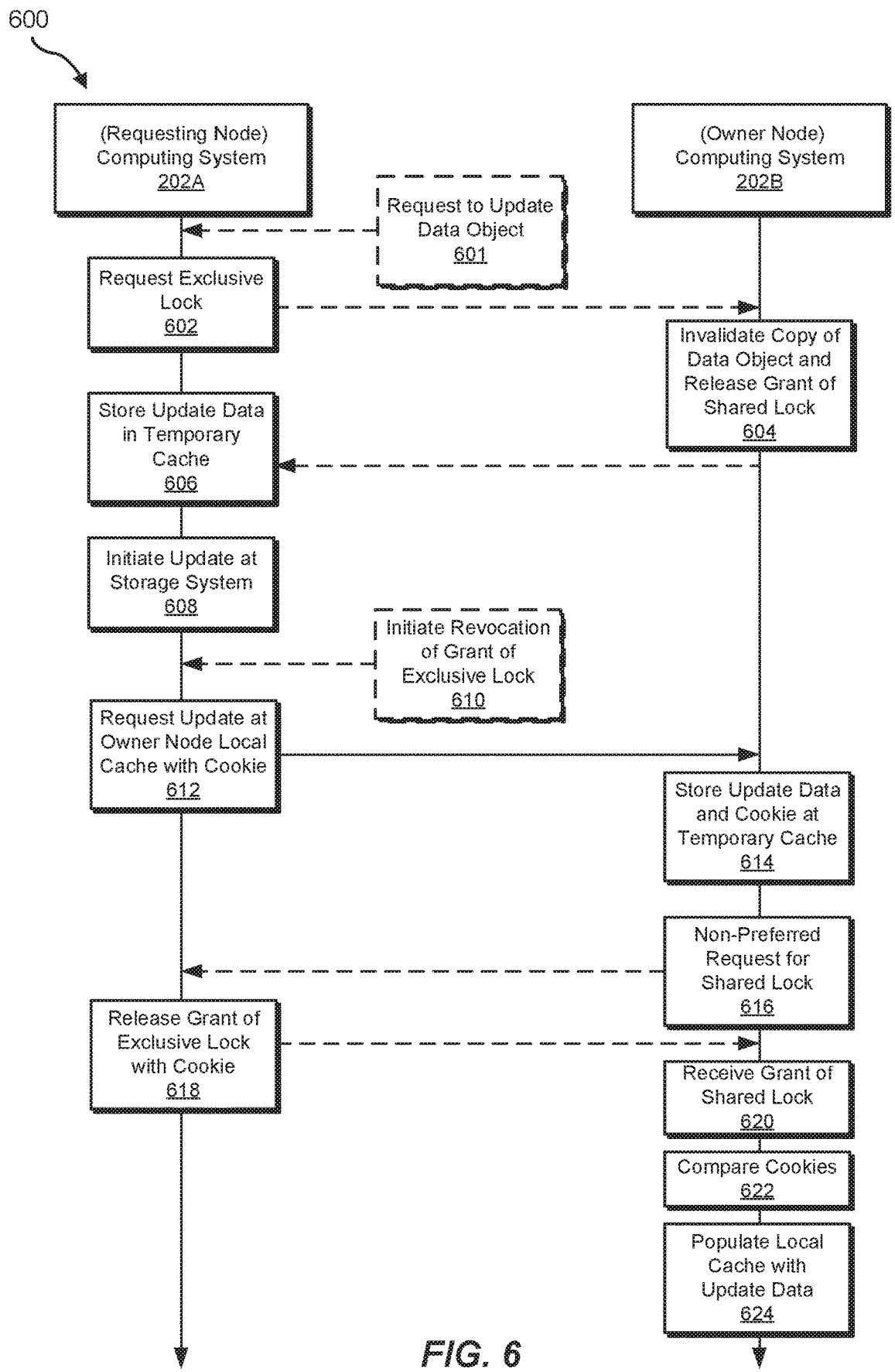
FIG. 6 is a communication diagram illustrating an additional example method for maintaining cache coherency.
Figure 7:
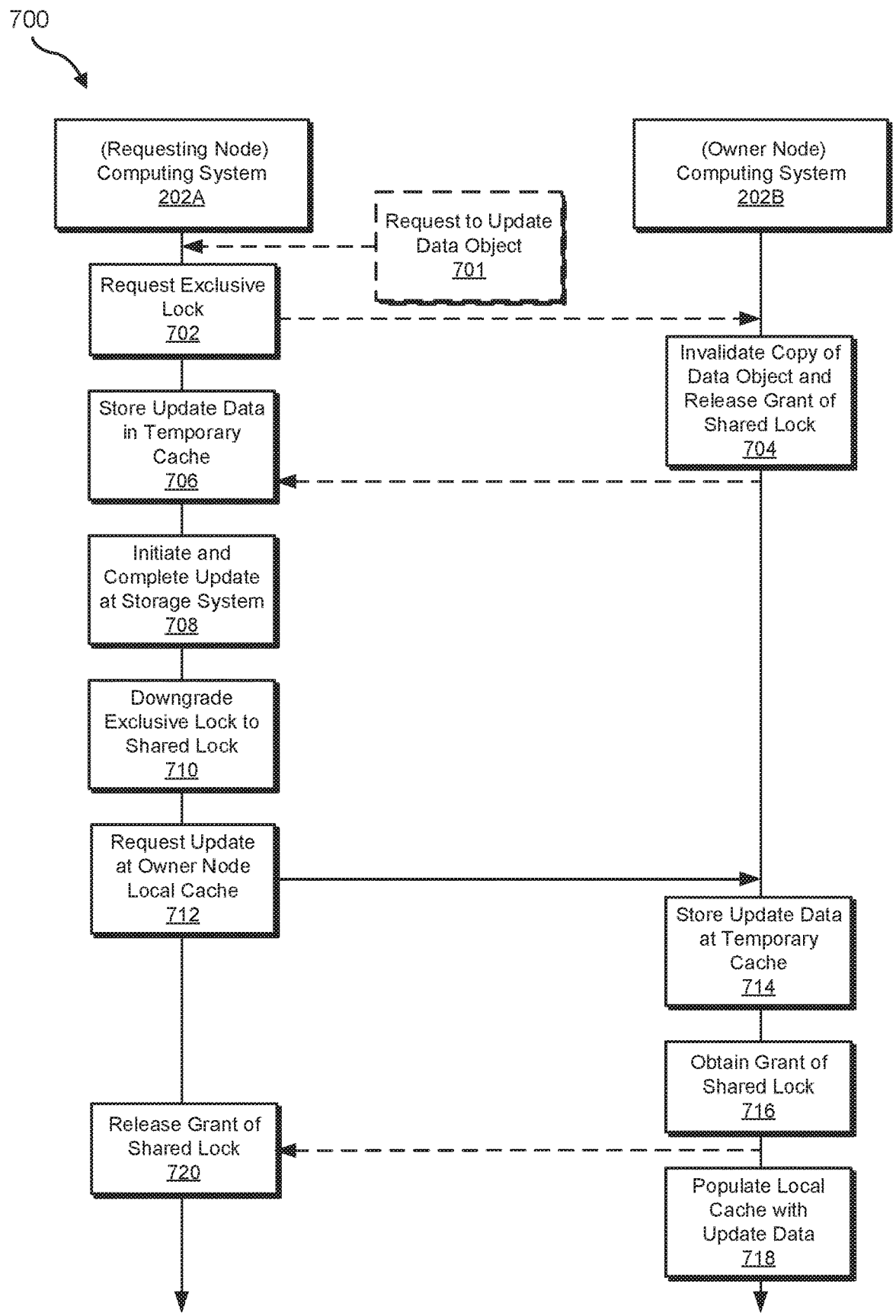
FIG. 7 is a communication diagram illustrating an additional example method for maintaining cache coherency.

Each of FIGS. 5, 6, and 7 is a communication diagram illustrating an example embodiment for maintaining cache coherency. Each of these figures depicts actions and associated communications involving a requesting node (denoted as computing system 202A) and an owner node (denoted as computing system 202B), as those terms are used above, for an associated example embodiment.

For example, FIG. 5 is a communication diagram of an example method 500 in which an owner node employs a preferred request for a shared lock governing a data object to be updated. In method 500, at step 501, the requesting node may receive a request to update a data object owned by the owner node. In some examples, the requesting node receives the request from a client system 210 over network 204. In example embodiments, the data object may be a file or portion thereof, a database table or portion thereof, or another type of data object. Also in some examples, the request to update the data object may be initiated by an application executing on client system 210, by an application executing on a server of a cloud system being employed by client system 210, or by other means. In some example embodiments, the request to update the data object may also include the update data to be used to update the data object.

In step 502, the requesting node, in response to receiving the update request, may request an exclusive lock for the data object. In some examples, the requesting node may first request the exclusive lock (e.g., using lock communication module 104) by transmitting a request for the exclusive lock to lock manager 206. In response to the request, lock manager 206 may then transmit an indication of a revocation of a grant to the owner node of a shared lock for the data object. As indicated above, the owner node may possess a grant of a shared lock while a copy of the data object is stored in local cache 124. At step 504, the owner node, in response to the indication of the revocation, may then invalidate the copy of the data object in local cache 124 and release the shared lock by indicating the release to lock manager 206. In response to the release, lock manager 206 may transmit an indication of a grant of the exclusive lock to the requesting node. In some examples, other nodes receiving the indication of the revocation of the grant of the shared lock may invalidate any copy of the data object in their local cache 124 as well.

At step 506, the requesting node, in response to the grant of the exclusive lock, may store the update data for the data object in temporary cache 122. At step 508, the requesting node, also in response to the grant of the exclusive lock, may initiate an update of the data object at backend storage system 208 (e.g., using node communication module 108). In some examples, the requesting node may forward the update data received in the request at step 502 from temporary cache 122 to backend storage system 208 as part of a direct input/output (I/O) operation. In other examples, the requesting node may forward the update data to backend storage system 208 as part of a delayed or buffered I/O operation, in which the update operation occurs in response to an initiation of the operation by a flushing daemon process operating in the requesting node. In other examples, a buffered or delayed I/O operation may occur in response to the grant of the exclusive lock to the requesting node being released or revoked, presuming the flushing daemon process has not initiated the I/O operation by then. At step 510, an action by a node (e.g., the requesting node, the owner node, or another node) may initiate a revocation or release of the grant to the requesting node of the exclusive lock. In some examples, the owner node or another node other than the requesting node may receive a read request for the data object (e.g., from a client system 210). In response, the node receiving such a request may request a shared lock for the data object (e.g., from lock manager 206). In response, lock manager 206 may transmit an indication to the requesting node to initiate the revocation of the exclusive lock at step 510. In other examples, the owner node may initiate the revocation of the exclusive lock (e.g., by requesting a shared lock for the data object) in response to a predetermined amount of time elapsing from the invalidating of the copy of the data object at step 506. In yet other examples, the requesting node itself may initiate a release of the exclusive lock, such as in response to an amount of data stored in its temporary cache 122 (e.g., for writes to local caches 124 of other nodes) exceeding a predetermined limit, or in response to an amount of time during which the update data has remained in temporary cache 122 of the requesting node exceeding a predetermined threshold.

At step 512, in response to the initiation of the revocation or release of the exclusive lock, the requesting node may transmit a request to the owner node (e.g., using node communication module 108) to update the data object at local cache 124 of the owner node. In some examples, the request includes the update data previously stored in temporary cache 122 of the requesting node. At step 514, in response to the update request from the requesting node, the owner node may store the received update data in its temporary cache 122.

In some examples, while the requesting node holds the grant of the exclusive lock, the requesting node (e.g., via one or more processes executing in the requesting node) may receive multiple requests to update the data object, each with associated update data. These multiple requests may be reflected in the update data accompanying the update request transmitted to the owner node at step 512, thus batching multiple updates of the data object into a single request to the owner node to update the data object.

At step 516, the owner node, also in response to the update request from the requesting node, may transmit a preferred request (e.g., to lock manager 206) to obtain a grant of a shared lock for the data object. In some examples, lock manager 206 will serve a preferred request ahead of preceding non-preferred requests for a lock (e.g., an exclusive lock or a shared lock) governing access to the data object. In response to the preferred request, lock manager 206 may transmit to the requesting node an indication of the preferred request. At step 518, the requesting node, in response to that indication, may complete the revocation of the exclusive lock, such as by explicitly releasing the exclusive lock by communicating the release to lock manager 206 (e.g., by lock communication module 104). In some examples, the release or revocation of the exclusive lock may cause lock manager 206 to grant the shared lock to the owner node due to the preferred status of the request for the shared lock. At step 520, the owner node may receive (e.g., from lock manager 206) an indication of the grant of the shared lock to the owner node. At step 522, the owner node, in response to the indication of the grant of the shared lock, may populate its local cache 124 with the update data in its temporary cache 122 to create an updated copy for the data object. Thereafter, the owner node may hold the grant of the shared lock so that the copy of the data object in local cache 123 remains available for use by the owner node and others.

In the method 500, the use of the preferred request for the shared lock may ensure that the owner node will populate its local cache 124 with the update data for the data object in response to the update of the data object initiated by the requesting node before any other node may update the data object again. In addition, in some example embodiments, the use of the preferred request ensures that the owner node can service read requests after the updating of the data object using the updated copy of the data object stored in local cache 124 of the owner node without having to retrieve the data object from backend storage system 208.

FIG. 6 is a communication diagram of an example method 600 in which an owner node employs a non-preferred, or standard, request for a shared lock governing a data object to be updated. In example embodiments, lock manager 206 may serve a non-preferred request for a shared lock in the order in which it was received relative to other lock requests.

In method 600, steps 601 through 610 are analogous to steps 501 through 510 of method 500, as described above in association with FIG. 5. At step 612, the requesting node, in response to an initiation of the revocation or release of the grant of the exclusive lock held by the requesting node, may transmit a request (e.g. using node communication module 108) to the owner node to update local cache 124 of the owner node with update data for the data object. In some examples, the update data accompanies the update request. Additionally, in some examples, the update request may include a "cookie" for authenticating the update data. In an example embodiment, the cookie may be a unique character string, a hash of the update data, or another type of data that is uniquely identified with the update data in some way.

At step 614, in response to the update request, the owner node may store the update data and the corresponding cookie in its temporary cache 122. Also in response to the update request, at step 616, the owner node may transmit to lock manager 206 (e.g., using lock communication module 104) a non-preferred or standard request for a shared lock for the data object. Thereafter at step 618, in response to an indication from lock manager 206 that the owner node has requested a shared lock, the requesting node may release the grant of the exclusive lock, such as by transmitting an indication of the release to lock manager 206. In some examples, the requesting node may include the cookie corresponding to the update data it previously forwarded to the owner node to the release indication transmitted to lock manager 206.

At step 620, the owner node may receive an indication of a grant of the shared lock after the release of the exclusive lock at step 618. Unlike in method 500, in which the owner node was ensured to be the first to obtain the grant of the shared lock after the release of the grant of the exclusive lock held by the requesting node, other nodes may have obtained a grant of an exclusive lock for the data object prior to the granting of the shared lock to the owner node. In such examples, the owner node may have received multiple sets of update data for the data object from multiple nodes, each with a corresponding cookie, prior to the grant of the shared lock to the owner node. Consequently, in some examples, lock manager 206 may transmit an indication of a grant of the shared lock to the owner node along with the cookie associated with the update data provided by the last node to update the data object.

Thereafter, at step 622, the owner node, after receiving the grant of the shared lock and the associated cookie, may compare that cookie to each cookie stored in association with each copy of update data stored in temporary cache 122 of the owner node (e.g., using authentication module 110) to determine which copy of the update data was the last to be received at the owner node. At step 624, the owner node may populate its local cache 124 with the latest copy of the update data for the data object having a corresponding cookie that matches the cookie received with the indication of the grant of the shared lock.

In method 600, although the owner node employs a standard request instead of a preferred request for the shared lock, the use of authentication cookies facilitates a mechanism whereby the owner node may identify the latest, and thus correct, copy of update data with which to populate its local cache 124 to service subsequent data requests for the data object.

In both method 500 and method 600, the requesting node releases the grant of the exclusive lock in response to some event, such as a read request for the data object, as discussed above. FIG. 7 is a communication diagram of an example method 700 in which the requesting node instead downgrades the exclusive lock it holds for the data object to a shared lock.

In method 700, steps 701 through 706 are analogous to steps 501 through 506 of method 500, as described above in association with FIG. 5. At step 708, the requesting node, in response to obtaining a grant of the exclusive lock for the data object at step 704, may initiate and await completion of an update operation for the data object at backend storage system 208. At step 710, in response to completion of the update of the data object at backend storage system 208, the requesting node may downgrade the exclusive lock it holds to a shared lock for the data object. In some examples, the requesting node may transmit a request to lock manager 206 to downgrade the lock and receive an indication from lock manager 206 an acknowledgment of the downgrade.

At step 712, in response to the downgrade, the requesting node may transmit a request to the owner node to update local cache 124 of the owner node with the update data that was used to update the data object in backend storage system 208.

At step 714, in response to receiving the update request from the requesting node, the owner node may store the update data received in the update request to its temporary cache 122. At step 716, after storing the update data for the data object in temporary cache 122, the owner node may obtain a grant of a shared lock for the data object (e.g., from lock manager 206, by way of requesting the lock and receiving the grant in response to the request, as described above). At step 718, the owner node, once the grant of the shared lock is obtained, may then populate its local cache 124 with the update data stored in temporary cache 122 as a copy of the data object, by which the owner node may then serve read requests for the data object. At step 720, the requesting node, in response to the owner node receiving the grant of the shared lock, may then release its grant of the shared lock, ensuring that an intervening node will not update the data object prior to the owner node receiving its grant of the shared lock.

In the method 700, because the requesting node downgrades its exclusive lock prior to sending the update request for the data object to the owner node, other nodes may obtain a shared lock prior to the owner node receiving the update request from the requesting node, thus possibly forcing a read of the update data from the data object stored in the backend storage system 208. As a result, the update data for the data object may not be available in local cache 124 of the owner node to serve all read requests after the data object has been updated in backend storage system 208. Further, since the requesting node downgrades the exclusive lock after the update operation at backend storage system 208 has completed, method 700 may be more applicable to systems in which direct I/O operations are employed instead of delayed I/O operations.

As explained above in connection with FIGS. 1 through 7, a clustered storage system employing a distributed cache over multiple nodes may maintain cache coherency among the nodes by allowing a node receiving update data for a data object to forward that data to the owner node of the data object, thereby allowing the updating of the local cache of the owner node without requiring the owner node to retrieve the updated data object from a backend storage system in at least some situations. Consequently, the systems and methods described herein may improve overall read performance of the clustered storage system, especially for read accesses of recently updated data objects. This improvement is possible even in clustered storage systems in which less than all nodes incorporate a local cache. Moreover, the systems and methods disclosed above may reduce the overall amount of read activity at the backend storage system, thus facilitating overall faster read and update access of the data objects at the backend storage system by the various nodes.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for maintaining cache coherency, at least a portion of the method being performed by a computing device comprising at least one processor, the method comprising:

receiving, by an owner node of a plurality of nodes of a clustered storage system, an indication of a revocation of a grant to the owner node of a shared lock for a data object owned by the owner node;

invalidating, by the owner node in response to the indication of the revocation of the grant to the owner node of the shared lock, a copy of the data object in a local cache of the owner node;

releasing, by the owner node in response to the indication of the revocation of the grant to the owner node of the shared lock, the grant of the shared lock;

receiving, by the owner node after the releasing of the grant of the shared lock, a request from a first requesting node to update the data object in the local cache of the owner node;

transmitting, by the owner node in response to the request to update the data object, a request for a shared lock for the data object;

receiving, by the owner node, an indication of a grant of the shared lock to the owner node; and updating, by the owner node in response to the grant of the shared lock, the data object in the local cache.

2. The computer-implemented method of claim 1, wherein the updating of the data object in the local cache comprises populating the data object in the local cache with data received in the request to update the data object.

3. The computer-implemented method of claim 2, further comprising:

receiving, by the owner node from a second requesting node of the plurality of nodes, a request to read the data object; and transmitting, by the owner node to the second requesting node in response to the request to read the data object, the data object from the local cache of the owner node to the second requesting node.

4. The computer-implemented method of claim 1, wherein the local cache of the owner node is located on a solid-state drive of the owner node.

5. The computer-implemented method of claim 1, wherein:

the receiving, by the owner node, of the request from the first requesting node to update the data object occurs while the first requesting node holds a grant of an exclusive lock for the data object;

the request for the shared lock comprises a preferred request for the shared lock prior to a release of the grant of the exclusive lock by the first requesting node; and the grant of the shared lock to the owner node occurs prior to grants of preceding requests for a lock for the data object.

6. The computer-implemented method of claim 5, wherein the release of the grant by the first requesting node of the exclusive lock is initiated in response to a non-preferred request for the shared lock for the data object from a second requesting node of the plurality of nodes in response to the second requesting node receiving a read request for the data object.

7. The computer-implemented method of claim 5, wherein the release of the grant by the first requesting node of the exclusive lock is initiated in response to a non-preferred request for the shared lock from the owner node in response to the owner node receiving a read request for the data object.

8. The computer-implemented method of claim 5, wherein the release of the grant by the first requesting node of the exclusive lock is initiated in response to a non-preferred request for the shared lock from the owner node in response to a predetermined amount of time elapsing from the invalidating of the copy of the data object in the local cache of the owner node.

9. The computer-implemented method of claim 5, wherein the release of the grant by the first requesting node of the exclusive lock is initiated in response to an amount of data stored in a temporary cache of the first requesting node exceeding a predetermined limit.

10. The computer-implemented method of claim 5, wherein the release of the grant by the first requesting node of the exclusive lock is initiated in response to an amount of time during which update data for the data object has remained in a temporary cache of the first requesting node exceeding a predetermined limit.

11. The computer-implemented method of claim 1, wherein the receiving, by the owner node, of the request from the first requesting node to update the data object occurs while the first requesting node holds a grant of a shared lock for the data object.

12. The computer-implemented method of claim 11, wherein the first requesting node holds the grant of the shared lock as a result of a downgrade of a grant to the first requesting node of an exclusive lock for the data object.

13. The computer-implemented method of claim 12, wherein the downgrade of the exclusive lock to the shared lock is initiated by the first requesting node.

14. The computer-implemented method of claim 12, wherein the downgrade occurs after the first requesting node stores data for the request to update the data object in a backend storage system accessible by the owner node.

15. The computer-implemented method of claim 11, wherein the indication of the grant of the shared lock to the owner node occurs while the first requesting node retains the grant of the shared lock to the first requesting node.

16. The computer-implemented method of claim 1, wherein the invalidating of the copy of the data object in the local cache of the owner node occurs concurrently with the invalidating of a copy of the data object in a local cache of at least one other node of the plurality of nodes.

17. The computer-implemented method of claim 1, wherein the receiving of the request to update the data object in the local cache comprises storing, by the owner node, data in the request to update the data object to a temporary cache of the owner node that is separate from the local cache of the owner node.

18. The computer-implemented method of claim 1, wherein the receiving, by the owner node, of the indication of a revocation of the grant to the owner node of the shared lock is responsive to a request by the first requesting node for a grant of an exclusive lock for the data object to initiate an update operation of the data object to a backend storage system accessible by the owner node.

19. A system for maintaining cache coherency, the system comprising:

a lock communication module, stored in memory, that receives an indication of a revocation of a grant to an owner node of a plurality of nodes of a clustered storage system of a shared lock for a data object owned by the owner node;

a local cache control module, stored in memory, that invalidates, in response to the indication of the revocation of the grant to the owner node of the shared lock, a copy of the data object in a local cache of the owner node, wherein the lock communication module, in response to the indication of the revocation of the grant to the owner node of the shared lock, releases the grant of the shared lock; and a node communication module, stored in memory, that receives, by the owner node, a request from a requesting node to update the data object in the local cache of the owner node after the releasing of the grant of the shared lock;

wherein the lock communication module transmits, in response to the request to update the data object, a request for a shared lock for the data object;

wherein the lock communication module receives an indication of a grant of the shared lock to the owner node; and wherein the local cache control module updates, in response to the grant of the shared lock, the data object in the local cache; and at least one physical processor that executes the lock communication module, the local cache control module, and the node communication module.

20. A non-transitory computer-readable medium comprising one or more computer-executable instructions that, when executed by at least one processor of a computing device, cause the computing device to:

receive an indication of a revocation of a grant to an owner node of a plurality of nodes of a clustered storage system of a shared lock for a data object owned by the owner node;

invalidate, in response to the indication of the revocation of the grant to the owner node of the shared lock, a copy of the data object in a local cache of the owner node;

release, in response to the indication of the revocation of the grant to the owner node of the shared lock, the grant of the shared lock;

receive, by the owner node, after the releasing of the grant of the shared lock, a request from a requesting node to update the data object in the local cache of the owner node;

transmit, in response to the request to update the data object, a request for a shared lock for the data object;

receive an indication of a grant of the shared lock to the owner node; and update, in response to the grant of the shared lock, the data object in the local cache.

* * * * *